United States Patent [19]

Penz et al.

[11] Patent Number: 4,500,171

[45] Date of Patent: Feb. 19, 1985

[54] PROCESS FOR PLASTIC LCD FILL HOLE SEALING

[75] Inventors: Perry A. Penz, Richardson; Jeffrey B. Sampsell, Plano, both of Tex.

[73] Assignee: Texas Instruments Incorporated, Dallas, Tex.

[21] Appl. No.: 384,356

[22] Filed: Jun. 2, 1982

[51] Int. Cl.³ .......................... G02F 1/13; G02B 0/00; A61J 5/04; B29C 13/00
[52] U.S. Cl. .................................. 350/320; 350/343; 264/4; 264/25
[58] Field of Search .................. 264/4, 25; 350/320, 350/343, 344, 339 R

[56] References Cited

U.S. PATENT DOCUMENTS

| 3,771,855 | 11/1973 | Burns | 350/344 X |
| 3,909,930 | 10/1975 | Gurtler | 350/344 X |
| 4,068,923 | 1/1978 | Toida | 350/343 X |

FOREIGN PATENT DOCUMENTS

| 33642 | 3/1978 | Japan | 350/344 |
| 32417 | 2/1982 | Japan | 350/339 R |
| 591442 | 8/1947 | United Kingdom | |

OTHER PUBLICATIONS

Aviram, A., "Packaging of Liquid-Crystal Displays," *IBM Disclosure Bull.*, vol. 15, No. 2, pp. 580-581, (Jul. 1972).

*Primary Examiner*—John K. Corbin
*Assistant Examiner*—Richard F. Gallivan
*Attorney, Agent, or Firm*—Robert Groover; James T. Comfort; Melvin Sharp

[57] ABSTRACT

The access hole for filling the liquid crystal cavity in an LCD having plastic front and rear members is sealed by welding the two members together. Pressure is applied during the weld to insure a good joint. The welding process avoids problems of non-adhesion or poor adhesion associated with the use of epoxy, especially the type of epoxy used for sealing glass LCDs.

7 Claims, 4 Drawing Figures

PROCESS FOR PLASTIC LCD FILL HOLE SEALING

BACKGROUND OF THE INVENTION

This invention relates to fabrication of plastic substrate liquid crystal displays (plastic LCD's) in general, and to LCD fill hole sealing in particular.

The fill hole seal has historically been the more difficult of the sealing operations in the fabrication of the LCD. Some of the reasons for this are: the liquid crystal material is very sensitive to any impurities that may result from the adhesive cure process; the liquid crystal forms an oily film on the surfaces to which the adhesive must bond; and the adhesive must bond to both the substrate and the perimeter seal adhesive which usually is recessed in between the substrates. These problems lead to failures due to leaks, and misalignment.

A general reference on plastic LCD, which is hereby incorporated by reference, is U.S. Pat. No. 4,228,574.

It is therefore an object of this invention to provide a method for a reliable fill hole seal for plastic LCDs.

Another object of this invention is to provide a a reliable fill hole seal structure for plastic LCDs.

SUMMARY OF THE INVENTION

In one aspect of the invention, there is provided a method for making a leak-free seal in the presence of liquid crystal material and perimeter seal material. In a preferred embodiment of the invention, a combination of heat and pressure is used to accomplish the seal. Two cylindrical rods having approximately the same radius as the width of the opening in the perimeter seal that is to be sealed. These cylinders are heated above the melting point of the plastic substrates. The rounded tips of the cylinders, which will come into contact with the plastic, are 'tinned' with a small amount of plastic. One of the cylinders is placed underneath the area to be sealed, with the working end up. The other cylinder is brought down into contact with the seal area with one edge of the cylinder just inside the liquid crystal cavity. The upper cylinder applies the pressure to force the molten plastic from between the cylinders to the edges to ensure a good seal.

DETAILED DESCRIPTION OF THE DRAWINGS

Figure 1:
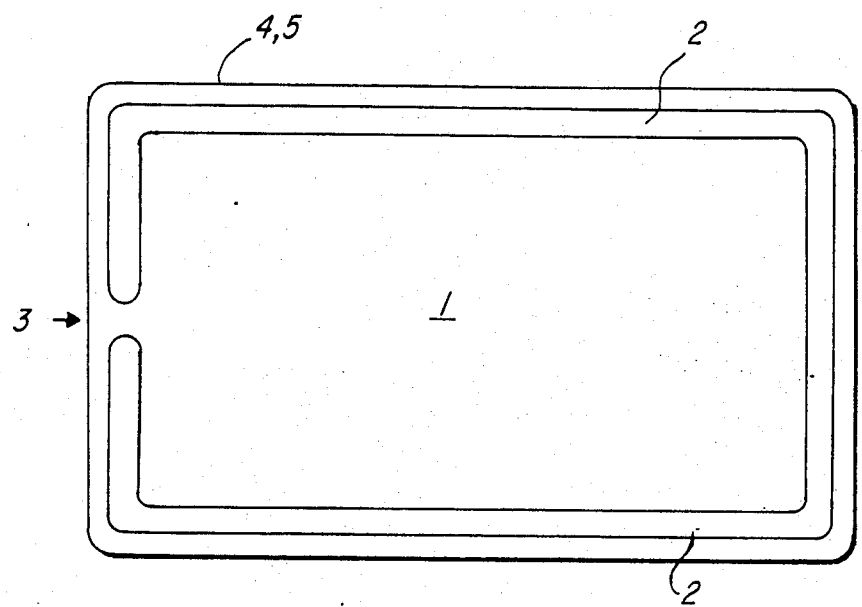
FIG. 1 is a drawing showing the location of the fill hole on a typical LCD.
Figure 2:
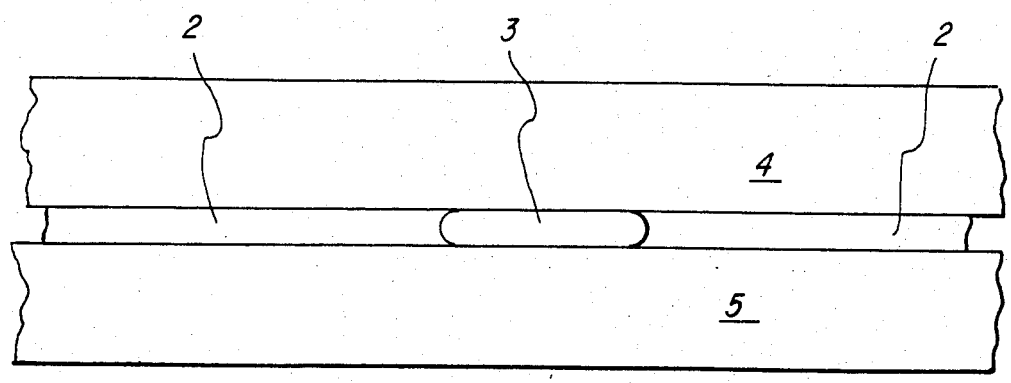
FIG. 2 is a side view of the LCD as shown in FIG. 1.

Referring now to FIG. 1, there is shown a typical LCD fill hole arrangement. The liquid crystal cavity 1 is surrounded by the perimeter seal area 2 except in the fill hole opening 3. In FIG. 2 is shown a side view of the same structure. The liquid crystal cavity 1 is surrounded by the perimeter seal area 2, and fill hole opening 3 is formed between front substrate 5 and rear substrate 4.

In the presently preferred embodiment, the front and rear substrates 4 and 5 comprise polyester plastic, 7 mils thick. Alternatively, other transparent plastics may be used, such as polycarbonate or CAB (cellulose acetate butyrate). The thickness of the substrate is also not critical. 7 mils has been found to be a convenient thickness, but a wide variety of other thicknesses may be used. Choice of thicknesses is dictated merely by considerations of durability and ease of handling.

Before the two substrates are glued together, desired materials will be patterned on the inner surfaces of the substrate, such as indium tin oxide row and column conductors, alignment layers, and optionally other structures known in the prior art of a plastic LCDs. The two substrates will be glued together along a perimeter seal area, to define the cavity into which the liquid crystal material is to be injected. Note that the perimeter seal area 2 does not completely surround the active display area. The fill hole opening 3 is defined by the gap in the perimeter seal. The perimeter seal material may be screened on epoxy in which case a room-temperature-setting epoxy is normally used, or may be preformed, in which case a hot-setting epoxy is normally used. After the two substrates 4 and 5 have been glued together along the perimeter seal area 2, the active device area 1 is filled with liquid crystal material, typically by vacuum filling. It is now necessary to seal the fill hole 3, according to the novel teaching of the present invention.

Typically the dimensions of the fill hole will be on the order of 8 microns high (since the height of the fill hole is defined merely by the thickness of a layer of glue), in the range of 1/16" to ⅛" wide, and in the range of 1/32" to ¼" long. However, these parameters can vary widely, without affecting the applicability of the present invention. In particular, the height of the hole may be anywhere from hundreds of microns down to a fraction of a micron, the width of the hole may be in the range of 0.01" to 0.5", and the length of the fill hole (i.e. the width of the perimeter seal area (2) may be from 0.01" to 1.0".

As noted, any attempt to glue this fill hole closed presents serious problems of adhesion and contamination. The present invention teaches an innovative method for sealing the fill hole, to produce an innovative LCD display structure.

Figure 3:
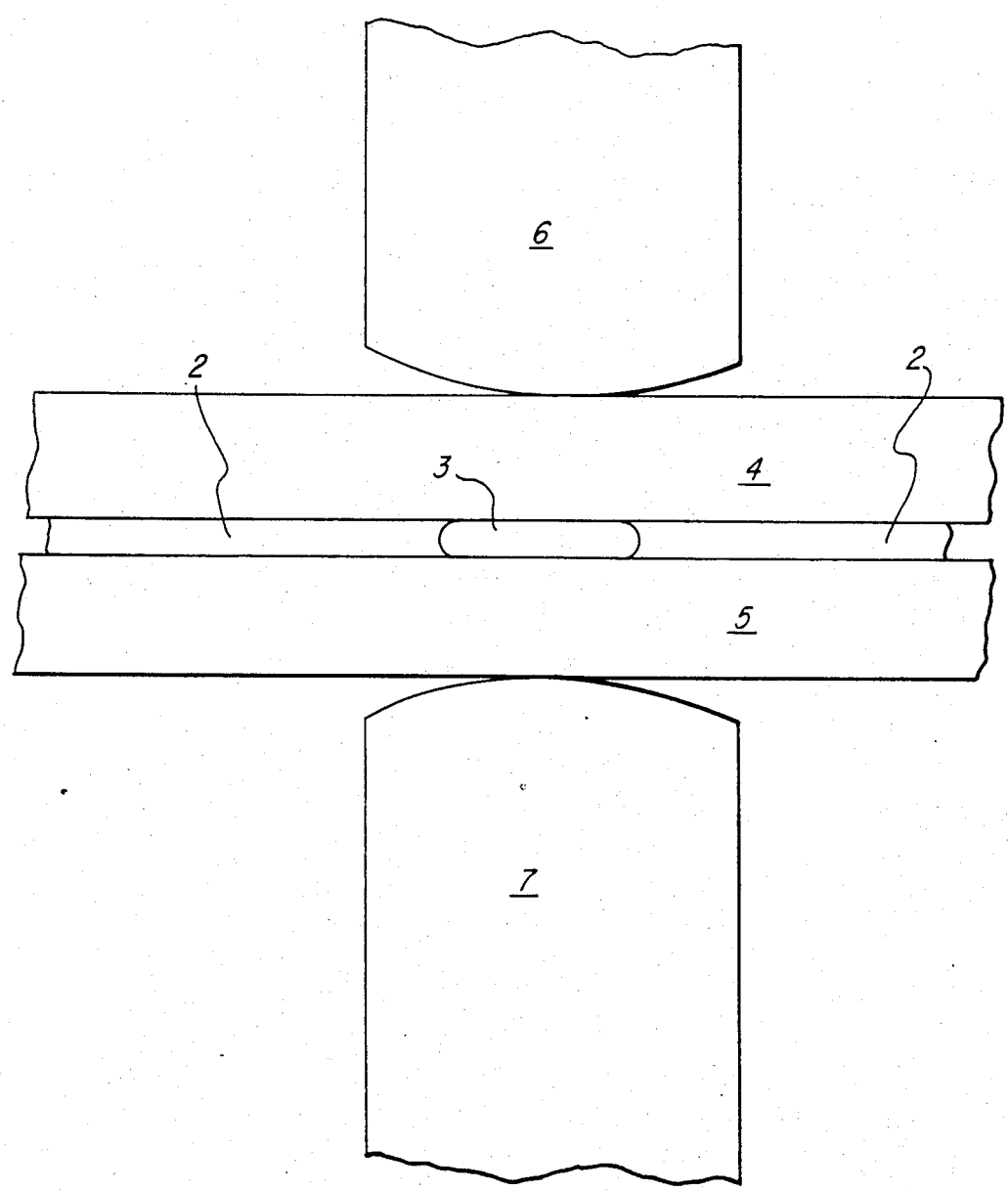
FIG. 3 is a drawing showing the proposed method of sealing, using heat and pressure.

The drawing of FIG. 3 shows a preferred embodiment of the present invention. In this method, cylindrical heating elements 6, 7 are positioned above and below the LCD structure in the area of the fill hole. The heating elements should be of sufficient size to fully cover the fill hole area, with adequate area outside the fill hole to insure a complete seal. The heating elements are brought to operating temperature (typically 200°–300° C.) and the lower element 7 held stationary while the upper element 6 is brought down into contact with the plastic upper substrate 5. The pressure forces the the structure into contact between the lower element 7 and the upper element 6. The pressure is maintained by the upper element while the substrates heat sufficiently to allow a hermetic seal to be formed. The LCD is then drawn from between the heating elements and allowed to cool.

Of course, the lower cylindrical element 7 may be moved while the upper element 6 is held stationary, or both elements may be moved together simultaneously.

In welding processes generally, it is necessary to supply "make up material" to effect a good weld. That is, it is not sufficient merely to heat the elements to be joined and bring them into contact, but liquid material must also be supplied, to bridge any remaining gap and provide a large cross sectional area of bonding material.

In the present invention, this is accomplished by using rounded tips on the cylindrical elements 7 and 8. These elements are heated by an external heat source, so that they remain approximately constant in temperature during the welding process. Since the protruding round tip of the element will first contact the plastic substrate, the plastic material at the center of the seal area will be heated first and hottest. By using a temperature for the elements which is greater than the melting point of the plastic substrate material, the plastic under the center tip of the element 7 or 6 is liquified under pressure. As the two elements move closer together, so that more of the rounded tip of each element comes into contact with the plastic substrate, melted plastic material from beneath the center of the tip is pushed towards the edge of the tip, while the edge of the tip heats the plastic beneath it. The result of this is that the edge of the rounded tip of each element 6 and 7 applies heat and pressure to the portions of the two plastic substrates adjacent to the fill hole area, while molten plastic material from the center of the fill hole area is pushed outward into these edge portions. The result of this is that a good weld is formed surrounding the fill hole area. This means that the liquid crystal material and the active display area one is hermetically sealed off from the outside, as desired.

Sealing according to the present invention need not be performed immediately after the liquid crystal material has been injected into the cavity 1. Since the liquid crystal material is so viscous, air bubbles will not creep into the cavity, although a certain amount of liquid crystal material may continue to ooze out through the fill hole. It is quite possible to delay a day or two between filling the display and sealing the fill hole, although in practice the liquid crystal material will absorb water from the atmosphere (which is undesirable) if such a delay is permitted in an uncontrolled atmosphere.

The diameter of the two cylindrical elements 6 and 7 must be larger than the width of the fill hole gap, and is preferably at least twice the width of the fill hole gap.

The radius of curvature of the tip of the elements 6 and 7 is defined by two considerations. First, if the tip radius is too small, the molten polyester from the center will be forced out into areas where the two substrates have not been subjected to enough heat and pressure from the edge of the tip, so that a good weld will not be formed. Second, if the tip radius is too large, (and particularly if the tips are flat), molten polyester will not flow from the center to the edges, and the necessary makeup material for a good weld at the edges will therefore not be provided. Thus, the presently preferred embodiment uses elements having a diameter of ½" and a radius of curvature of approximately 3 inches. Thus, the presently preferred embodiment teaches that the tip radius should be approximately 32 times of the width of the fill hole. Secondly, tip radii within the range of 10 to 100 times the width of the fill hole are also useful embodiments of the present invention. It is also possible to practice the present invention using other tip radii from ½" to infinity, although values at the extreme ends of this range are believed to be substantially less desirable.

The temperature of the elements 6 and 7, as noted, should be above the melting point of the plastic substrate. However, the melting point of polyester is not a universal constant, since the melting point varies, with the molecular weight, from batch to batch of plastic. For example, when the plastic substrates have a melting point of 250° C., the temperature of the elements 6 and 7 is preferably in the neighborhood of 285° C. Where the plastic substrates have a melting point of 200° C., then the elements 6 and 7 are preferably heated to about 220° C. That is, in the preferred embodiments, the difference between the temperature of the elements and the melting temperature of the plastic should be within 20% of (the difference between the melting point and 120° C., divided by 4), except that the temperature of the fingers should preferably be at least 20° higher than the melting point of the plastic. More generally, the present invention may also be applied using element temperatures between the melting point of the plastic and 50° above the melting point of the plastic, or even higher.

A further significant process parameter in applying the present invention is the duration of time during which the elements 6 and 7 are in contact with the plastic substrates. In the presently preferred embodiment, the time is about 2 seconds. A significant time in contact is necessary, as noted above, to permit the plastic material at the edges of the fill hole to heat up and become sufficiently plastic to create a good weld. However, the present invention can also be applied with welding durations as short as ½ second, or even shorter, depending on the thickness and the material composition of the plastic substrates used. Maximum weld duration is limited by process efficiency, and by the possibility of excessive large-scale melting if extremely long contact times are used.

The pressure applied on the elements 6 and 7 when they first contact the plastic material will typically be on the order of magnitude of one ounce. However, a wide range of pressures may be used. After the elements 6 and 7 have come into contact with each other, the pressure applied has no relevance to the quality of the weld formed.

The surfaces of the elements 6 and 7 are typically coated with a thin layer of molten plastic, of the same kind as composes the plastic substrates. This is done to assist thermal contact by wetting, and assure uniform conduction of heat into the critical region around the fill hole.

In the presently preferred embodiment, the center of the elements 6 and 7 is aligned with the edge of the plastic substrates. This has the advantage that the molten polyester displaced by the center of the tips of the elements is not moved to protrude beyond the edge of the displayed device. It also has the advantage that the device can be removed from the welding apparatus before the elements have separated, which is convenient in automated manufacturing environments. However, where it is desired not to use peripheral space of the plastic device, it is also possible to construct a device having a fill hole in its center, or at least remote from its periphery, and to apply the present invention to welding of a centrally located fill hole. In this case, the preferred alternative embodiment is to use a small additional piece of plastic, located over the fill hole, to supply makeup material, and to use only one curved heated electrode to form a weld between this small additional piece of plastic and the region of the substrate surrounding the fill hole. Alternatively, the two substrates can be welded together, using two elements as discussed above.

Figure 4:
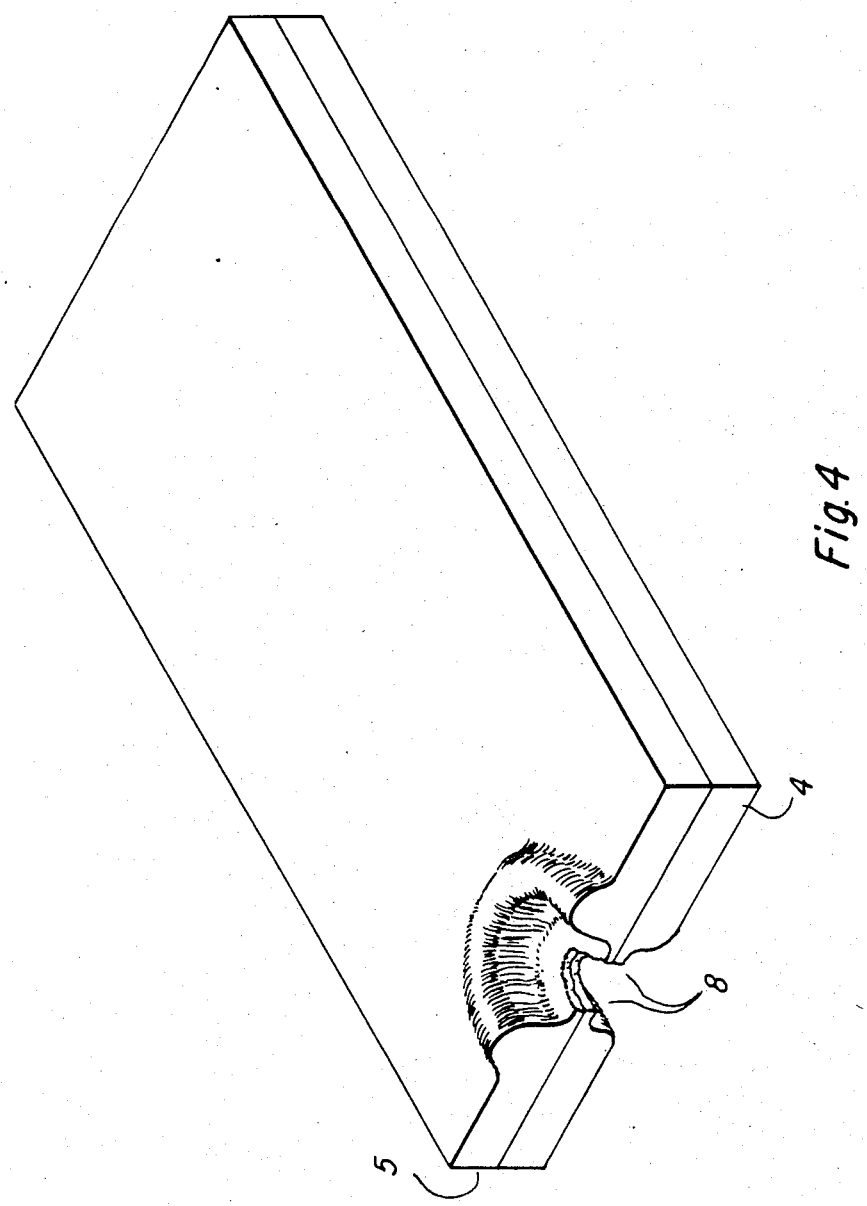
FIG. 4 is a drawing showing an LCD sealed by use of the method of present invention.

As seen in FIG. 4, the end result of fill hole sealing according the present invention will normally be a thinned area of the display, surrounded by a raised bead where the weld has been formed.

What is claimed is:

1. A method for fabricating plastic liquid crystal displays, comprising the steps of:
   providing front and rear plastic liquid crystal display substrates;
   bonding said front and rear substrates together along a portion of the periphery thereof, said bonding step leaving a fill hole gap at one point in the periphery of said substrates;
   pressing first and second heated elements against said plastic substrates in the neighborhood of said fill hole, said heated elements being heated to a temperature which is greater than the melting temperature of said plastic substrates;
   wherein the portion of each said element in contact with said plastic substrates comprises a spherical radius of curvature which is in the range of 10 to 100 times the width of said fill hole gap.

2. The method of claim 1, wherein the temperature of said elements is less than 50° greater than the melting temperature of said plastic substrates.

3. The method of claim 1 wherein the temperature of said elements differs from temperature of said substrates by a value which is within 20% of (the amount by which the melting temperature of said substrates exceeds 120° C., divided by 4).

4. The method of claim 1 wherein each said element comprises a diameter which is at least twice the width of said fill hole gap.

5. The method of claim 1, wherein each said substrate comprises polyester.

6. The method of claim 1, comprising the step of:
   filling the space defined by said substrates with liquid crystal material, prior to
   welding said fill hold closed.

7. A method for fabricating a plastic liquid crystal display, comprising the steps of:
   providing first and second plastic LCD substrates;
   joining said first and second substrates together along the entire periphery of each said substrate;
   providing a fill hole in said first substrate;
   filling said substrate with liquid crystal material;
   welding said fill hole to said second substrate.

* * * * *